US010733652B2

(12) United States Patent
Thorvaldsson

(10) Patent No.: US 10,733,652 B2
(45) Date of Patent: Aug. 4, 2020

(54) METHOD OF HANDLING WEIGHT DATA IN A DATA PROCESSING SYSTEM

(71) Applicant: MAREL ICELAND EHF, Gardabaer (IS)

(72) Inventor: Bjorn Thorvaldsson, Reykjavik (IS)

(73) Assignee: MAREL ICELAND EHF, Gardabaer (IS)

(*) Notice: Subject to any disclaimer, the term of this patent is extended or adjusted under 35 U.S.C. 154(b) by 159 days.

(21) Appl. No.: 15/570,464

(22) PCT Filed: May 2, 2016

(86) PCT No.: PCT/EP2016/059765
§ 371 (c)(1),
(2) Date: Oct. 30, 2017

(87) PCT Pub. No.: WO2016/174264
PCT Pub. Date: Nov. 3, 2016

(65) Prior Publication Data
US 2018/0144386 A1    May 24, 2018

(30) Foreign Application Priority Data
Apr. 30, 2015  (EP) .................................. 15166021

(51) Int. Cl.
*G01G 7/00*        (2006.01)
*G06Q 30/06*       (2012.01)
(Continued)

(52) U.S. Cl.
CPC ......... *G06Q 30/0627* (2013.01); *G06Q 10/08* (2013.01); *G06Q 30/0185* (2013.01);
(Continued)

(58) Field of Classification Search
None
See application file for complete search history.

(56) References Cited

U.S. PATENT DOCUMENTS 6,810,355 B1   10/2004  Kreidler et al.
10,247,598 B2*  4/2019  Moser .................. G01G 23/017
(Continued)

FOREIGN PATENT DOCUMENTS

WO      2005111922 A1    11/2005

OTHER PUBLICATIONS

"Software Guide (Measuring Instruments Directive 2014/32/EU)," WELMEC European Cooperation in Legal Metrology, WELMEC 7.2, 2015, pp. 1-114.
(Continued)

*Primary Examiner* — Aditya S Bhat
(74) *Attorney, Agent, or Firm* — Workman Nydegger

(57) ABSTRACT

A method of handling weight data in a data processing system involves acquiring and storing weight data of an item. A verification information is generated for the item based on the weight data, where the verification information is associated to the determined weight, the generation of the verification information including one of the following steps: a) encrypting the weight data where the verification information corresponds to the encrypted weight data, or b) determining a first message authentication code where the verification information corresponds to the first message authentication code, wherein when using the weight data the validity of the weight data for the item is verified by use of the verification information and if the weight data is verified as being valid weight data, a graphic representation of the weight data is generated.

15 Claims, 5 Drawing Sheets

(51) Int. Cl.
  *G06Q 30/00* (2012.01)
  *G06Q 10/08* (2012.01)
  *H04L 29/06* (2006.01)
  *G01G 19/414* (2006.01)
  *G06F 21/60* (2013.01)

(52) U.S. Cl.
  CPC ......... *H04L 63/123* (2013.01); *G01G 19/414* (2013.01); *G06F 21/602* (2013.01); *G06Q 10/0875* (2013.01); *H04L 2209/805* (2013.01)

(56) References Cited

U.S. PATENT DOCUMENTS

2005/0171738 A1* 8/2005 Kadaba .................. G07C 5/085
  702/187
2013/0133958 A1* 5/2013 Crooks ................ G01G 23/017
  177/1

OTHER PUBLICATIONS

European Search Report from EP Application No. EP 15 16 6021, dated Oct. 7, 2015.
International Search Report from PCT Application No. PCT/EP2016/059765, dated Jul. 1, 2016.
"Guide for Examining Software (Non-Automatic Weighing Instruments)," WELMEC European Co-operation in Legal Metrology, WELMEC 2.3, Issue 3, May 2005, 23 Pages.

* cited by examiner

METHOD OF HANDLING WEIGHT DATA IN A DATA PROCESSING SYSTEM

CROSS-REFERENCE TO RELATED APPLICATIONS

This application is a national stage entry of International Application No. PCT/EP2016/059765, filed May 2, 2016, which is incorporated by reference in its entirety.

FIELD OF THE INVENTION

The present invention relates to a method and a system for handling weight data in a data processing system.

BACKGROUND OF THE INVENTION

A common task in the food processing industry is to weigh and label items. The instruments used in such a process are subject to regulatory control. Specifically the weighing means, e.g. any type of weighing device, is subject to examination and certification by official authorities. When the weight data obtained from such an instrument is printed on a label that is to be affixed to the weighed item the printed weight is by the letter of the regulation (if not always in practice) also subject to regulatory control in the sense that the printed weight must be the same weight as is recorded by the scale.

If a label printer is directly connected to the weighing means the label printer is considered to be under full control of the scale and is therefore covered by the certification of the scale.

In many cases however the weight data is passed from the scale to a computer system which formats the label information before sending it to the label printer. In such instances the label printer is not considered to be under full control of the scale and is therefore not covered by the certification of the scale.

There can be many reasons why such an arrangement is used instead of printing the label directly from the scale. The most common one is that it's impractical to convey all the information that needs to be on such a label to the scale. Label designs can be quite complex and have multiple variable items of information on them, e.g. a barcode, expiry date, price per kg, net weight, total price, packing date, lot number, storing information, content information etc.

Another reason could be that the label is to be printed at a later stage, such as shortly before the item is to be palletized. This may be because the time from where the weighing takes place until the item is e.g. palletized can be few seconds or even few minutes (or even longer) but during this time the items may e.g. be damaged or even accidentally drop from a conveyor conveying the items and thus get lost in the system. It is thus preferred not to assign the items to e.g. a given pallet until it is ensured that the items are actually there, i.e. as close to the pallet as possible.

Another reason could be that the item requires a customer-specific label but has not been sold to a customer at the time it is weighed. Thus, it may be preferred to produce items in one location, ship them to a distribution centre and label them when they are shipped to final customers.

In current solutions that exist today, in the above mentioned scenarios it cannot be guaranteed to the satisfaction of the authorities that weighing data has not been manipulated with when the actual labelling takes place.

SUMMARY OF THE INVENTION

On the above background it is an object of embodiments of the present invention to provide a secure method of handling weight data and where any kind of manipulation with weight data may is prevented at all times, especially in instances where a label printer is not directly connected to the weighing means.

In general, the invention preferably seeks to mitigate, alleviate or eliminate one or more of the above mentioned disadvantages of the prior art singly or in any combination. In particular, it may be seen as an object of embodiments of the present invention to provide an improved method of handling weight data that solves the above mentioned problems.

In a first aspect of the invention a method is provided of handling weight data in a data processing system, the method comprising:

acquiring weight data of an item and storing the acquired weight data, generating a verification information for the item based on the weight data, where the verification information is associated to the determined weight, the generation of the verification information including one of the following steps:

a) encrypting the weight data where the verification information corresponds to the encrypted weight data, or b) determining a first message authentication code where the verification information corresponds to the first message authentication, wherein when using the weight data the validity of the weight data for the item is verified by use of the verification information and if the weight data is verified as being valid weight data, a graphic representation of the weight data is generated.

Accordingly, manipulation of the weight data from where the weight data is acquired until an actual labelling with the weight data takes place may be prevented.

It should be understood that the step of determining the first method authentication code preferably at least comprises the step of calculating the authentication code or generating it by other means, such as by a hash function.

Thus, a method is provided that potentially allows certifying the complete weighing and labelling process. This includes scenarios where e.g. a label printer is not directly connected to the weighing means and where an intermediate processing step is required before the actual labelling takes place. As an example, it may be impractical or impossible to convey all the information that needs to be on a label to the scale due to the complexity of the label design. A label may as example be designed for carrying information such as, but not limited to, barcode information, expiry date, price per kg, net weight, total price, packing date, lot number, storing related data, content information, supplier information etc.

Another example of the complexity relating to labelling items is where consecutive items have different labels or different information, e.g. due to different lot numbers, different suppliers, different type of items etc., meaning that before the actual labelling takes place a computer system may need to perform one or more processing steps, e.g. to identify each and individual item before labelling the items.

Another scenario where it is impractical to directly connect a label printer to a weighing means is e.g. when the items are to be conveyed by a conveyor to a palletizing area where they are e.g. tracked, where the palletizing area is located at an area different form the weighing means and where it is preferred to label the items as close to the palletizing area as possible. The items may be assigned to different pallets within the palletizing area meaning that highly advanced planning may need to be made before the actual palletizing process starts. In such instances, the advantage of labelling the items close to the palletizing area instead of at the weighing means is that the items may be damaged or even fall off the conveyor while being conveyed from the weighing means to the palletizing area. Thus, instead of assigning the items to a given pallet at the weighing means it is preferred to do assign the items to a pallet as close as possible to the palletizing area.

Yet another scenario where it is impractical to directly connect a label printer to a weighing means is where the item requires a customer-specific label but has not been sold to a customer at the time it is weighed. Thus, it may be preferred to produce items in one location, ship them to a distribution centre and label them when they are shipped to final customers.

Based on the above, and as already addressed, a secure method is provided where any kind of manipulation or e.g. accidental manipulation with the weigh data is impossible.

By the term graphic representation may according to the present invention be understood as kind of image such as bitmap image and the like.

The weight data may as an example be a text string comprising one or more of the following information: the actual net weight of the item, the date and time (e.g. exact time when the item was weighed), the price of the item, the tare etc.

In one embodiment, the step of verifying the validity of the weight data comprises decrypting the weight data. Accordingly, the verification information is generated by encrypting the weight data where the verification information corresponds to the encrypted weight data, and when e.g. labelling the item the weight data is decrypted where the verification information corresponds to the encrypted weight data and verification comprises decrypting the weight data. It is thus be ensured that the weight data cannot be manipulated with or changed in any way from the where the weight data was acquired until the actual labelling takes place.

In one embodiment, the step of verifying the validity of the weight data comprises utilizing currently stored weight data in determining a second message authentication code, where the second message authentication code is compared to the first message authentication code, where in case of a match the weight data is verified as being valid weight data. The first and the second message authentication codes, which may e.g. be a checksum it typically calculated using a secret algorithm where the same algorithm is used in calculating the first and the second checksum. Accordingly, the verification information is generated by determining the first checksum where the verification information corresponds to the first checksum, and when e.g. labelling the item at a later time the second checksum is determined and compared to the first checksum where in case of a match the weight data is considered to be valid weight data. A simple solution is thus provided in prevent any kind of manipulation with the weight data from the time where the weight data was acquired until the time where the actual labelling took place.

Weight date that are used for commercial transactions, i.e. used as basis for sales or purchase, are subject to legal control in several countries. Hence weighing instruments used for such purposes are exposed to authorized examination and legal verification. Consequently, software that executes functions that are involved in the signal path from the weighing signal sensor to the final weight presentation is part of such examination and hence cannot be modified without renewed examination. Such software is often referred to as "legally relevant software", herein referred to also as "legal software", "legal software part", and "protected software".

Other software, it may even be used in the same computer, i.e. software that is not in the signal path from the weighing signal sensor to the final weight presentation, is hence referred to as "legally non-relevant software", which is herein referred to as "non-protected software", "non-protected software part", and "free programmable software".

The International Organization for Legal Metrology (OIML) and the European Cooperation in Legal Metrology (WELMEC) have issued recommendations and guides to be used in relation to legally relevant software and legally non-relevant software. The definitions of "legally relevant software" and "free programmable software" of WELMEC Software Guide 7.2 (2015) and WELMEC Guide for Examining Software (Non-automatic Weighing Instruments), WELMEC 2.3, Issue 3 (May 2005) are relied upon herein.

The data processing system may be controlled by software comprising at least one protected software part. As mentioned above, the protected software part is also referred to as the legal software part, and as "legally relevant software". The protected software part is also referred to as a certification entity or a certified weight bitmap component. The protected software part is certified and non-manipulatable by a user. The protected software part is thus preferably stored in a non-accessible executable format only on a non-interchangeable chip. In order to ensure reliability of the weight data and in order to fulfill regulatory requirements, the weight data for the item is preferably verified by the protected software part, whereas other operations of the data processing system may be carried out by free programmable software.

In one embodiment, the method further comprises generating a label graphic representation to be printed and attached to the item, the label graphic representation including item related information excluding the verified weight information (i.e. weight data), the label graphic representation containing area adapted to receive the graphic representation of the verified weight data when printing out a label. Preferably, the label graphic representation preferably also excludes the price that typically can only be calculated if the actual net weight of the item is known and optionally may contain an area adapted to receive the price of the item when printing the label.

In order to enhance user convenience, the label graphic representation may be generated by the free programmable software, whereas the label graphic representation and the graphic representation of the weight data are preferably combined into a common graphical representation for subsequent printing by the protected software part. User convenience may thus be ensured whilst not compromising reliability of the weight information eventually printed.

Alternatively, the label graphic representation to be printed and attached to the item may be generated in the protected software part, in which case the label graphic representation includes item related information including the verified weight information. At least the verified weight data and optionally the entire common graphical representation may be transmitted from said processor to the label printer.

Herein, the term "graphical representation" is to be understood as a set of data on the basis of which a label printer may print graphics representing information contained in the set of data, such as, e.g., weight information, item identification, product description, batch identification, production time, etc. The term bitmap is commonly used in the art as a synonym for the term "graphical representation".

The protected software part may be executed in a label printer for printing the label bitmap. Thus, inconveniences related to transmission of the verified weight information and the common graphic representation from the protected software part to the label printer may be avoided. Alternatively, the protected software part may be executed in a processor of the data processing system not forming part of the label printer. One benefit of the latter alternative is that a plurality of distributed label printers may be provided, which may receive common graphical representations from a central weighing and database facility.

The at least one protected software part may comprise a plurality of software parts programmed in common source code, e.g. in a single software block, or programmed in various source code, i.e. in separate software blocks. The protected software part(s) may be executed centrally at a server or locally at weighing and/or labelling stations.

In one embodiment, the method further comprises printing a label containing the verified weight data. Accordingly, in case the validity of the weight data for the item is not verified no printing will take place and thus it is ensured that only labels are printed where the weight has been verified.

In one embodiment, the position where the weight data of the item is acquired is substantially the same as the position where printing the label takes place.

In particular, the weight data of the item may acquired by a scale at a first factory site, and the label may be printed by a label printer at a second factory site. The first factory site may be remote from the second factory site. Thus, items may be weighed at one site, and transported to a another site, where labels are attached to them. Alternatively, the labels and may be printed at the same factory site, at which the weight data are acquired, but at a different position within the factory site.

In one embodiment, the position where the weight data of the item is acquired is different from the position where printing the label takes place.

In one embodiment, the method of handling weight data until the actual labelling may be performed the weight data is sent from a weighing device such as a scale to an application software along with verification information, for example a checksum, whereby the verification information is computed from the weight data by a secret method, wherein when the application prints a label it formats a bitmap that holds all the label information except the weight and preferably also the price of the item, wherein this bitmap is sent to a certified software component along with the weigh information and the verification information. The verification information cannot be manipulated by the application because its computation is secret, wherein the certified software component (which is certified together with the scale) re-computes the verification information from the weight data and compares it with the verification information sent by the application software. If the verification information matches the software component adds the weight data to the label bitmap and sends the complete bitmap to the printer. If the verification information does not match no label is printed.

In a second aspect of the invention, the system comprising:
weighing means for acquiring weight data of an item,
a processor for generating a verification information for the item based on the weight data, where the verification information is associated to the determined weight,
a storage means for storing the weight data and the associated verification information,
wherein the generation of the verification information by the processor includes one of the following steps:
  a) encrypting the weight data where the verification information corresponds to the encrypted weight data, or
  b) determining a first checksum where the verification information corresponds to the first checksum,
wherein when using the weight data the validity of the weight data for the item is verified by use of the verification information and if the weight data is verified as being valid weight data, a graphic representation of the weight data is generated.

In one embodiment, the system further comprises a label printer configured for printing a label containing the verified weight data.

In a distributed system, the weighing means may comprise a central scale, and the storage means may comprise a central database, in which case the system may further comprise a plurality of distributed scanners for item identification at distributed sites, and/or a plurality of distributed scales for check-weighing, and/or a plurality of distributed label printers for printing labels including the graphic representation of the weight data.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
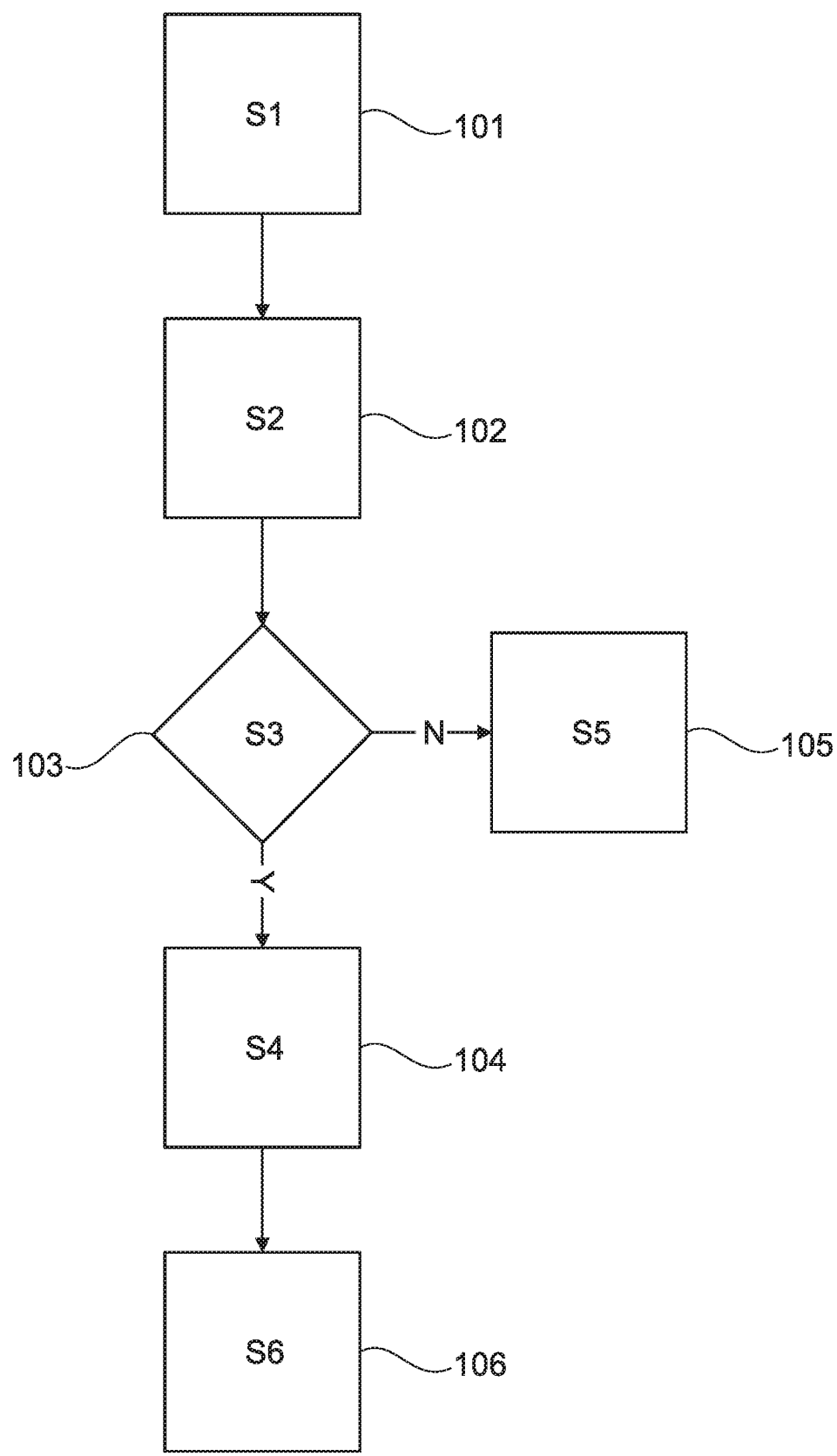
FIG. 1 shows a flowchart of one embodiment of a method according to the present invention method of handling weight data in a data processing system.

FIG. 1 shows a flowchart of one embodiment of a method according to the present invention of handling weight data in a data processing system.

In step (S1) 101 weight data is acquired of an item and stored. The weight data may as an example be a text string comprising one or more of the following information: the actual net weight of the item, the price of the item, the tare etc.

In step (S2) 102 a verification information is generated for the item based on the weight data, where the verification information is associated to the determined weight. The generation of the verification information includes one of the following steps:

a) encrypting the weight data where the verification information corresponds to the encrypted weight data, or
b) determining a first message authentication code, e.g. a checksum where the verification information corresponds to the first message authentication.

In step (S3) 103, the validity of the weight data for the item is verified. In the former case a) this may be done by decrypting the encrypted weight data whereby it may be ensured that no manipulation with the weight has taken place. In the latter case b) the currently stored weight data is used in determining a second message authentication code, where both the first message authentication code and the second message authentication code are calculated using one and the same secret algorithm. In the following, it will be assumed that the first and the second message authentication codes are checksums.

If the validity of the weight data for the item is verified as being valid weight data (S4) 104, a graphic representation of the weight data is generated.

If however the validity of the weight data for the item is not verified as being valid weight data (S5) 105, e.g. the second checksum is not the same as the first checksum, no graphic representation of the weight data is generated, i.e. no printing will take place.

In one embodiment, the secret algorithm to calculate the first and the second checksums is a keyed-hash message authentication code (HMAC), which is well known to a skilled person in the art. This algorithm is a specific construction for calculating a message authentication code (MAC) involving a cryptographic hash function in combination with a secret cryptographic key. As with any MAC, it may be used to simultaneously verify both the data integrity and the authentication of a message. Any cryptographic hash function, such as MD5 or SHA-1, may be used in the calculation of an HMAC. The cryptographic strength of the HMAC depends upon the cryptographic strength of the underlying hash function, the size of its hash output, and on the size and quality of the key. The HMAC may be defined as:

$$HMAC(K,m)=H((K \oplus opad)|H((K \oplus ipad)|m)),$$

where H is a cryptographic hash function, K is a secret key padded to the right with extra zeroes to the input block size of the hash function, or the hash of the original key if it's longer than that block size, m is the message to be authenticated or in this case the weight, | denotes concatenation, $\oplus$ denotes exclusive or (XOR), opad is the outer padding (0x5c5c5c . . . 5c5c, one-block-long hexadecimal constant), and ipad is the inner padding (0x363636 . . . 3636, one-block-long hexadecimal constant).

In another embodiment, the secret algorithm for the first and the second checksums may be any type of a secret algorithm or a mathematical function where at least some of the weight data is used as an input in the algorithm or the mathematical function.

In step (S6) 106, if the validity of the weight data for the item is verified as being valid weight data a label graphic representation is printed by a printing device, where the label graphic representation includes variable information obtained from the weight data, i.e. the actual net weight of the item and optionally the price of the item. The label graphic representation may be a bitmap having various item related information such one or more of the following: price/kg, lot number, ingredients, buyer of the item, the barcode etc. However, the bitmap contains one or more reserved areas within the label for the weight of the item and preferably also the price of the item.

Figure 2:
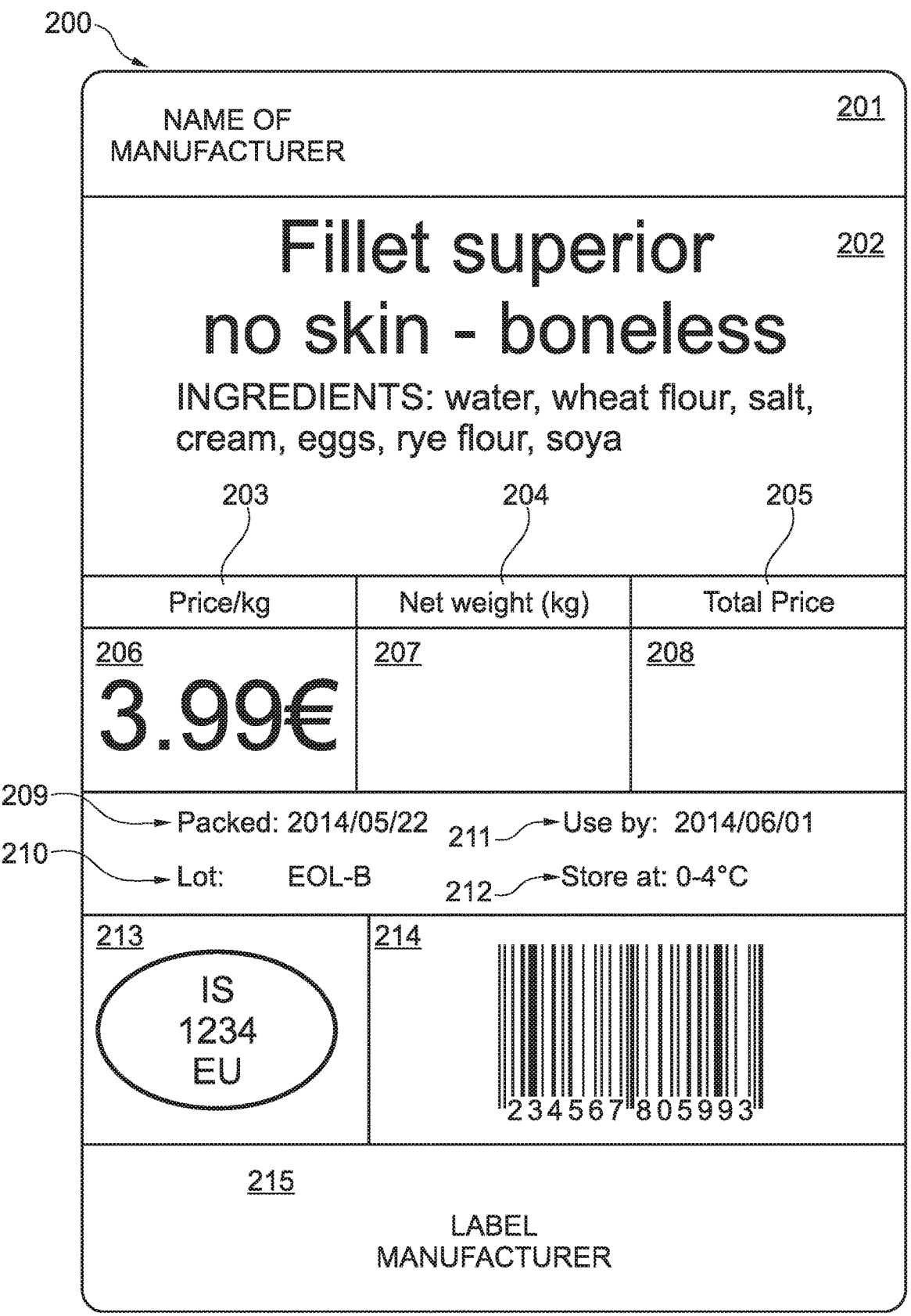
FIG. 2 shows one example of a label graphic representation, which may e.g. be a bitmap of a label, that is to be affixed to a weighed item after the item undergoes a verification process of the weighing as discussed in relation to FIG. 1.

FIG. 2 shows one example of a label graphic representation, which may e.g. be a bitmap of a label that is to be affixed to a weighed item after the item undergoes a verification process of the weighing as discussed in relation to FIG. 1.

The label graphic representation shown in this example contains several areas that are reserved in the label graphic representation for various basic information.

As an example, area 201 may illustrate the manufacturer of the item, area 202 illustrates information about the item content 202, areas 203-205 illustrate headings for areas 206-208, where area 203 is a heading for the price/kg, area 204 is a heading for the net weight and area 205 is a heading for the total price. Area 206 illustrates the price per kg, whereas area 207 and 208 are blank in the label graphic representation since the weighing has not yet been verified.

Other areas such as packing date 209, lot information 210, expiry date 211, storing information 212, plant approval number 213 and label manufacturer 215 and barcode 214 may already be present in the label graphic representation.

It should be noted that the information, the number of areas, the design of the labels etc. should not be construed as being limited to what is shown here. The label could e.g. only include information about the manufacturer where the remaining information is the net weight and the price.

Figure 3:
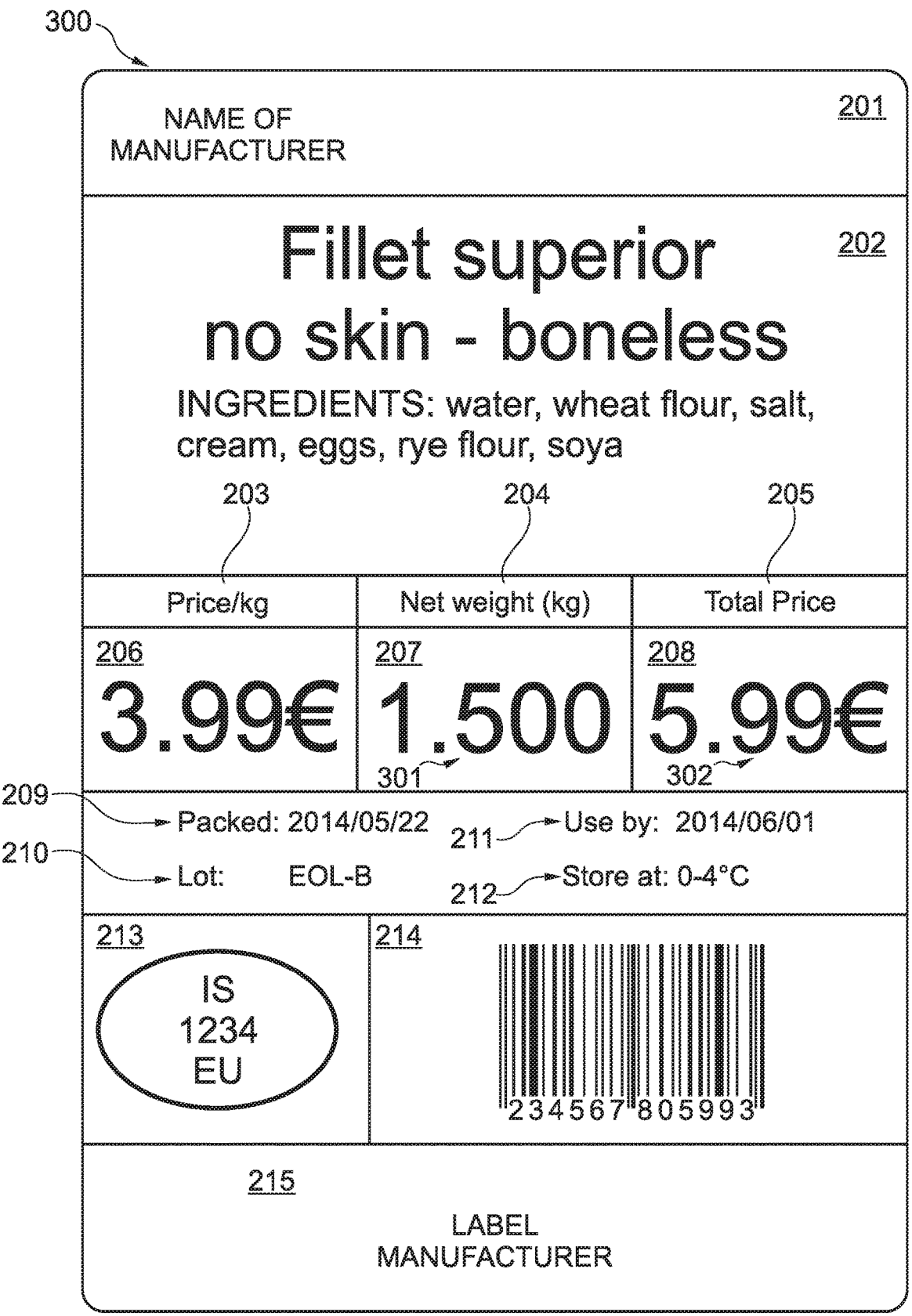
FIG. 3 shows a physical label printed to the item based on the label graphic representation shown in FIG. 2, where the weight of the item has been verified and printed on the label graphic representation.

FIG. 3 shows a physical label printed to the item based on the label graphic representation shown in FIG. 2, where the weight of the item has been verified and printed on the label graphic representation, and thus also the total price (calculated from the price/kg).

Figure 4:
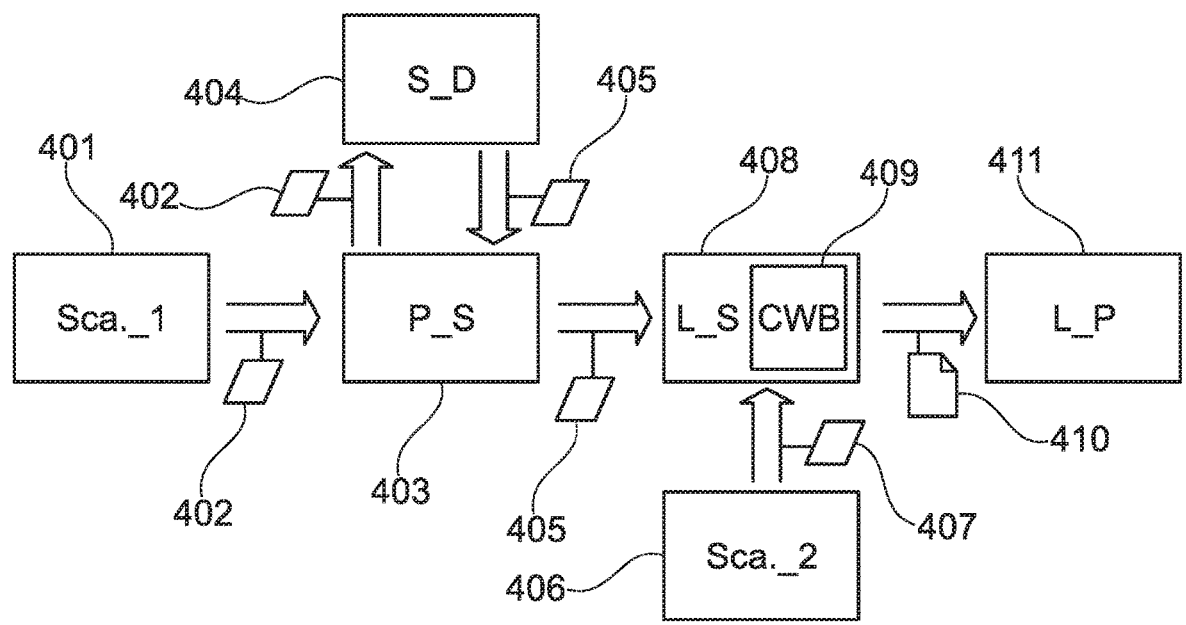
FIG. 4 shows a block diagram of one embodiment of a system according to the present invention for handling weight data in a data processing system.
Figure 5:
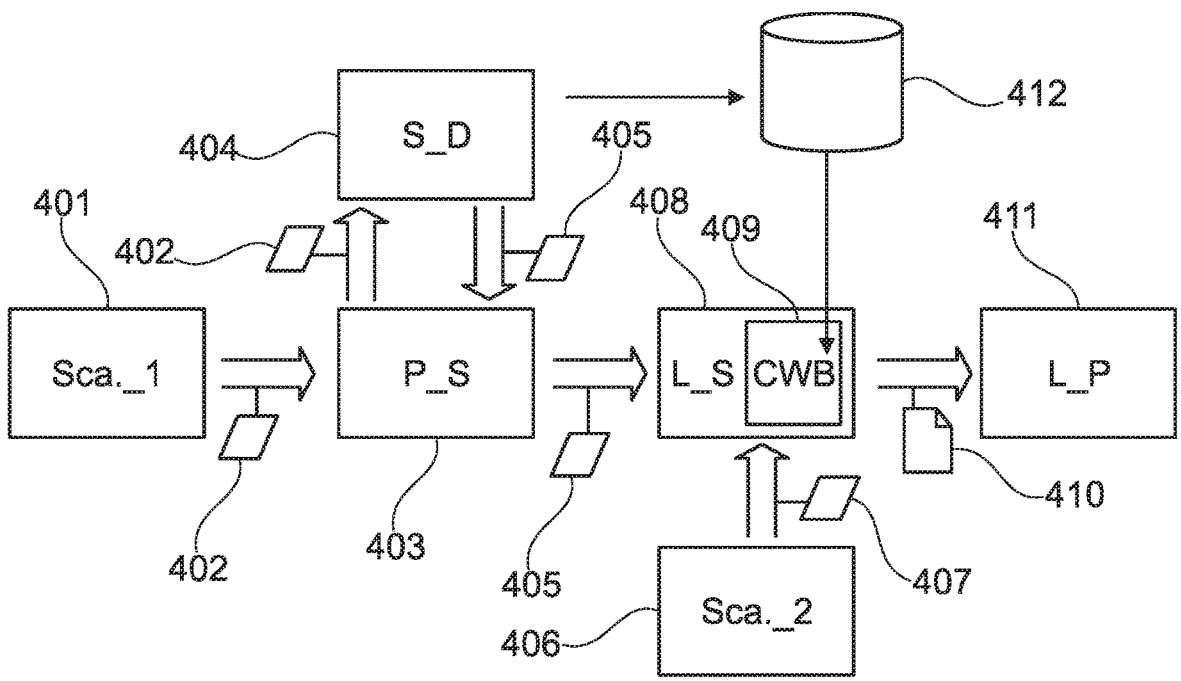
FIG. 5 shows the embodiment of FIG. 4 including a central database.

FIGS. 4 and 5 show block diagram of one embodiment of a system according to the present invention for handling weight data in a data processing system.

In this embodiment, the item may e.g. be a box having a pre-printed barcode or a RFID (Radio Frequency Identification) tag that uniquely identifies the box via an identification number (ID). The pre-printed barcode may, e.g., be provided on a label attached to a surface of the item. Such label is also referred to as a control label.

A first scanner (Sca._1) 401 initially scans the item and sends the scanned item identification ID 402 to a packing software (P_S) 403 that forwards the identification ID 402 to a scale device (S_D) 403, which may be any type of scale device such as a platform scale, where the items may be weighed while being placed on the platform. It should be understood scanning as used herein comprises optical scanning as well as other types of item identification, such as identification by RFID tags. A processor which may e.g. be comprised in the scale device (S_D) 404 utilizes the weight data obtained from the scale device as input to calculate a first checksum 405, which is associated to the weight data and forwarded to the packing software (P_S) 403 and stored. Both the weight data and the calculation of the checksum may be similar as discussed previously in relation to FIG. 1. In the embodiment of FIG. 4, the scale device (S_D) 404 may transmit to the packing software (P_S) 403 the checksum, as well as other data, such as item identification, weight, tare, weighing unit identification, and/or time and date of weighing.

A second scanner (Sca._2) 406 is provided for scanning the item at some later time point in the processing so as to uniquely identifying the item via item identification ID 407 before the actual labelling takes place. Instead of the first and the second scanners, a tracking feature may also to be utilized for tracking the item. A labelling software (L_S) 408 (herein also referred to as free programmable software or "legally non-relevant software") utilizes the scanned barcode ID 406 to identify the currently stored weight data associated for the item identification ID. A certification entity or a certified weight bitmap component (CWB) 409 (herein also referred to as the protected software part, the "legally relevant software" or the legal software part) calculates a second checksum 406 using the same secret algorithm as being used to calculate the first checksum and compares the second checksum with the first checksum for verifying weight data, i.e. to determine whether the weight data is still the same or not. If there is a match the weight data (e.g. weight in kg. and/or the price) is printed by a label printer (L_P) 411 on e.g. a pre-defined label graphic representation 410, e.g. similar as discussed in relation to FIGS. 2 and 3, and affixed to the weighed item. As shown in FIG. 5, a central database 412 is provided for receiving weight data from the scale device 404 and for communicating weight information to the certified weight bitmap component (CWB) 409. In the embodiment of FIG. 5, the scale device (S_D) 404 may transmit to the packing software (P_S) 403 the checksum only, or alternatively no data are transmitted from the scale device (S_D) 404 to the packing software (P_S) 403.

Figure 6:
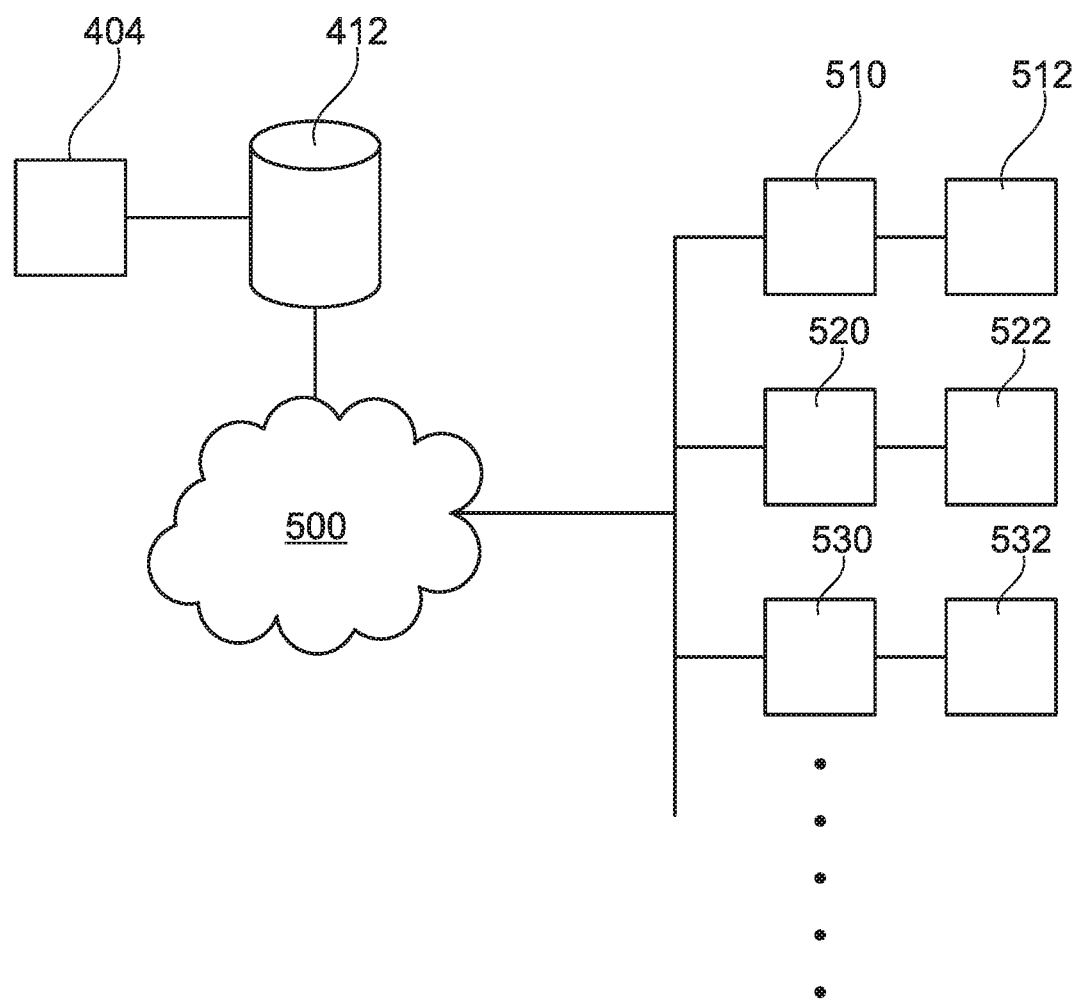
FIG. 6 shows a block diagram of a distributed system.

FIG. 6 illustrates a distributed system comprising central scale device 404 and database 412 connected to distributed scanners 510, 520, 530 and distributed label printers 512, 522, and 532 via a network 500, such as a wide-area network or a local-area network. Each set of scanners and label printers may be provided at mutually remote locations, such as at different factory sites, or at different production lines within a single factory site.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A method of handling weight data in a data processing system, the method comprising:
   acquiring weight data of an item and storing the acquired weight data,
   generating a verification information for the item based on the weight data, where the verification information is associated to the determined weight, the generation of the verification information including one of the following steps:
   a) encrypting the weight data where the verification information corresponds to the encrypted weight data, or
   b) determining a first message authentication code where the verification information corresponds to the first message authentication code,
   wherein when using the weight data the validity of the weight data for the item is verified by use of the verification information and if the weight data is verified as being valid weight data, a graphic representation of the weight data is generated, and if the weight data is not verified as being valid weight data, no graphic representation of the weight data is generated.

2. The method according to claim 1, wherein the step of verifying the validity of the weight data comprises decrypting the weight data.

3. The method according to claim 1, wherein the step of verifying the validity of the weight data comprises utilizing currently stored weight data in determining a second message authentication code, where the second message authentication code is compared to the first message authentication code, where in case of a match the weight data is verified as being valid weight data.

4. The method according to claim 1, wherein the data processing system is controlled by software comprising at least one free programmable software part and at least one protected software part, and wherein the weight data for the item is verified by the at least one protected software part.

5. The method according to claim 4, further comprising generating a label graphic representation to be printed and attached to the item, the label graphic representation includes item related information excluding the verified weight information, the label graphic representation containing an area adapted to receive the label graphic representation of the verified weight data when printing a label.

6. The method according to claim 5, wherein the label graphic representation is generated by the at least one free programmable software part, and wherein the label graphic representation and the graphic representation of the verified weight data are combined into a common graphic representation by the at least one protected software part.

7. The method according to claim 6, wherein the at least one protected software part is executed in a label printer for printing the common graphic representation.

8. The method according to claim 7, wherein the at least one protected software part is executed in a processor of the data processing system not forming part of the label printer, the method further comprising the step of transmitting at least the verified weight data and optionally the entire common graphical representation from said processor to the label printer.

9. The method according to claim 7, wherein a position where the weight data of the item is acquired is substantially the same as a position where printing the common graphic representation takes place.

10. The method according to claim 7, wherein a position where the weight data of the item is acquired is different from a position where printing the common graphic representation takes place.

11. The method according to claim 10, wherein the weight data of the item is acquired by a scale at a first factory site, and wherein the common graphic representation is printed by the label printer at a second factory site, and wherein the first factory site is remote from the second factory site.

12. The method according to claim 4, further comprising generating, in the at least one protected software part, a label graphic representation to be printed and attached to the item, the label graphic representation includes item related information including the verified weight information.

13. The method according to claim 1, wherein the weight data includes the actual net weight of the item and optionally a price of the item determined by the actual weight of the item.

14. A system for handling weight data in a data processing system, the system comprising:
   weighing means for acquiring weight data of an item, a processor for generating a verification information for the item based on the weight data, where the verification information is associated to the determined weight, a storage means for storing the weight data and the associated verification information, wherein the generation of the verification information includes one of the following steps:

a) encrypting the weight data where the verification information corresponds to the encrypted weight data, or b) determining a first message authentication code where the verification information corresponds to the first message authentication code, wherein when using the weight data the validity of the weight data for the item is verified by use of the verification information and if the weight data is verified as being valid weight data, a graphic representation of the weight data is generated, and if the weight data is not verified as being valid weight data, no graphic representation of the weight data is generated.

15. The system according to claim 14, wherein the weighing means comprise a central scale, and wherein the storage means comprise a central database, the system further comprising:

a plurality of distributed scales for check-weighing; and a plurality of distributed label printers for printing labels including the graphic representation of the weight data.

* * * * *